United States Patent
Naffziger et al.

(10) Patent No.: US 7,661,003 B2
(45) Date of Patent: Feb. 9, 2010

(54) SYSTEMS AND METHODS FOR MAINTAINING PERFORMANCE OF AN INTEGRATED CIRCUIT WITHIN A WORKING POWER LIMIT

(75) Inventors: Samuel D. Naffziger, Fort Collins, CO (US); Christopher A. Poirier, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 512 days.

(21) Appl. No.: 11/040,394

(22) Filed: Jan. 21, 2005

(65) Prior Publication Data

US 2006/0167657 A1 Jul. 27, 2006

(51) Int. Cl.
G06F 1/32 (2006.01)
G06F 1/26 (2006.01)
G01R 31/00 (2006.01)

(52) U.S. Cl. .................. 713/320; 713/300; 702/117
(58) Field of Classification Search .......... 713/320, 713/300; 702/117
See application file for complete search history.

(56) References Cited

U.S. PATENT DOCUMENTS

| | | | |
|---|---|---|---|
| 6,415,388 B1 | 7/2002 | Browning et al. | |
| 6,489,834 B2 | 12/2002 | Naffziger et al. | |
| 6,513,145 B1 | 1/2003 | Venkitakrishnan | |
| 6,647,501 B1 | 11/2003 | Ninomiya | |
| 6,785,826 B1 | 8/2004 | Durham et al. | |
| 6,795,927 B1 * | 9/2004 | Altmejd et al. | 713/300 |
| 6,984,064 B1 * | 1/2006 | Touzelbaev | 374/43 |
| 7,050,959 B1 * | 5/2006 | Pollard et al. | 703/21 |
| 2002/0130712 A1 | 9/2002 | Naffziger et al. | |
| 2002/0140467 A1 | 10/2002 | Naffziger et al. | |
| 2003/0110423 A1 * | 6/2003 | Helms et al. | 714/100 |
| 2003/0125900 A1 | 7/2003 | Orenstien et al. | |
| 2004/0117680 A1 * | 6/2004 | Naffziger | 713/322 |
| 2004/0128090 A1 | 7/2004 | Read et al. | |

OTHER PUBLICATIONS

Search Report for corresponding GB0601112.6; completed Apr. 12, 2006.

* cited by examiner

Primary Examiner—Ji H Bae

(57) ABSTRACT

Systems and methods for maintaining performance of an integrated circuit are disclosed. One embodiment of a system may comprise a working power limit evaluator that determines a working power limit as a function of at least one performance factor associated with variations that affect performance of the integrated circuit. The system may further comprise a power management system that varies power of the integrated circuit based on the working power limit and an actual power of the integrated circuit to maintain a substantially constant performance.

25 Claims, 4 Drawing Sheets

SYSTEMS AND METHODS FOR MAINTAINING PERFORMANCE OF AN INTEGRATED CIRCUIT WITHIN A WORKING POWER LIMIT

BACKGROUND

Power consumption is becoming an increasing concern in the design of integrated circuits (ICs), particularly for very large scale integration (VLSI) chip design. Increases in power consumption are outpacing the advantages of advances in scaling in silicon technologies, and the benefits of reducing power supply voltages. Power management has been recognized as an important consideration associated with the design and operation of VLSI (Very Large Scale Integration) chips to mitigate power consumption associated with VLSI chips. For example, power consumption is becoming a serious performance limiter for high speed microprocessors. For instance, a key design objective for microprocessor systems is providing the highest possible peak performance for computer-intensive code, while reducing power consumption of the microprocessor system.

As a result, power management systems have been employed that vary processor frequency and/or supply voltage in order to hold the power consumption of a chip below a certain level that is acceptable for use in a given system (e.g., within a desktop, workstation or portable devices). However, power management systems do not take into consideration variations that can affect application performance across different systems.

SUMMARY

One embodiment of the present invention may comprise a system for maintaining performance of an integrated circuit. The system may comprise a working power limit evaluator that determines a working power limit as a function of at least one performance factor associated with variations that affect performance of the integrated circuit. The system may further comprise a power management system that varies power of the integrated circuit based on the working power limit and an actual power of the integrated circuit to maintain a substantially constant performance.

Another embodiment may comprise an integrated circuit. The integrated circuit may comprise a parameter storage device that stores at least one manufacturing test parameter that is based on at least one of inherent characteristics and manufacturing variations of the integrated circuit, and a power management system that varies power of the integrated circuit based on actual power of the integrated circuit and a working power limit derived from the at least one manufacturing test parameter and at least one operational condition to maintain a substantially constant performance on a given.

Yet another embodiment may comprise a power management system for an integrated circuit. The system may comprise means for maintaining power below a specified power limit, and means for adjusting the specified power limit based on variations that affect performance of the integrated circuit to maintain substantially constant performance.

Yet a further embodiment may comprise a method for maintaining performance of an integrated circuit. The method may comprise characterizing at least one variation of the integrated circuit that affects performance, determining a working power limit based on the characterization and a specified power limit, and adjusting the actual power of the integrated circuit based on the determined working power limit.

DETAILED DESCRIPTION

This disclosure relates generally to systems and methods for maintaining performance (e.g., frequency) of an integrated circuit that employs power management. In some embodiments, the systems and methods determine a working power limit as a function of a characterization of at least one variation of the integrated circuit that affects performance. In some embodiments, substantially constant performance can be maintained for a plurality of integrated circuits of a given design, for example, on a given application.

Figure 1:
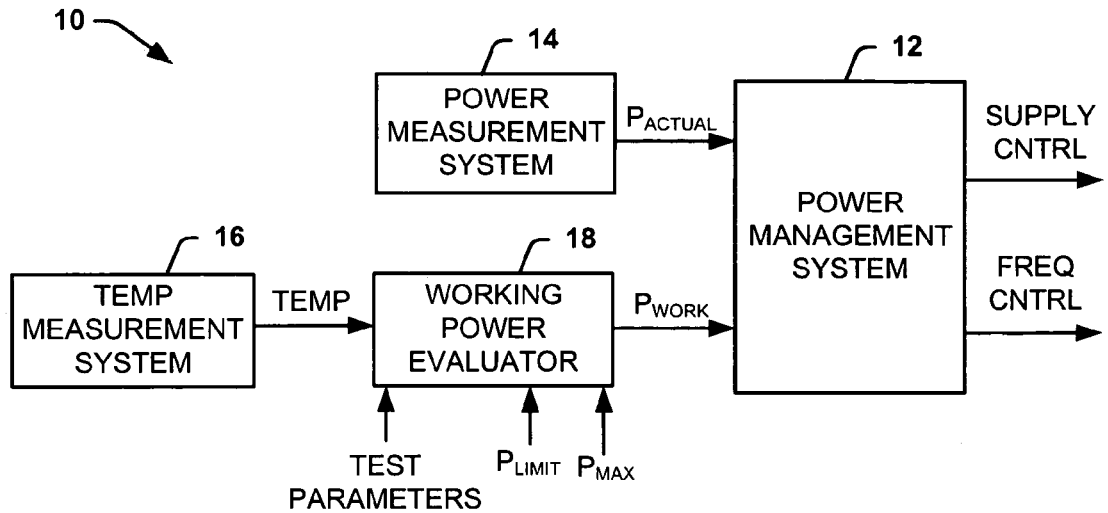
FIG. 1 illustrates a block diagram of an embodiment of a system for maintaining performance of an integrated circuit.

FIG. 1 illustrates a system 10 for maintaining performance of an integrated circuit. The system 10 can be implemented on an integrated circuit (IC) chip or die, such as a VLSI chip (e.g., a microprocessor, an application specific integrated circuit (ASIC)) or the like. The system 10 includes a power management system 12 that dynamically manages power associated with an integrated circuit chip or die. The power management system 12 manages power by dynamically varying frequency and supply voltage of the integrated circuit or die. The power management system 12 can vary the frequency by generating a frequency control signal to a system clock of the integrated circuit chip or die. The power management system 12 can vary the supply voltage by generating a voltage supply control signal to a system power supply or power regulator. The power management system 12 employs a power management algorithm to maintain actual power consumption at or below a working power limit by periodically comparing a working power limit $P_{WORK}$ with the actual power consumption $P_{ACTUAL}$ of the integrated circuit chip or die.

The working power limit $P_{WORK}$ is dynamically adjusted below a specified maximum allowable power limit for a given chip to provide performance repeatability, for example, by maintaining a substantially constant frequency regardless of inherent characteristics, manufacturing variations and operational conditions. The working power limit $P_{WORK}$ is derived from at least one factor that is a function of performance variations on a given application across different integrated circuit chips of a given design. For example, a work station that employs a processor to run a given software application may perform differently than a similar work station that employs a processor of the same design at a given power limit. There are a number of factors that makes performance repeatability difficult for a processor that dynamically manages power through voltage and/or frequency scaling. For example, power consumption and frequency of operation of circuits vary with temperature, since the subthreshold leakage of circuits (e.g., transistors) in the chip is temperature dependent. Thus, a system that manages power by varying voltage and/or frequency will provide a different voltage and/or frequency across different temperatures to hold the chip to a specified power limit.

Additionally, manufacturing variations cause chips to consume different amounts of power for the same frequency of operation. That is leakage power and switching power can vary with each chip of a given design as a result of silicon variations inherent in each chip. For example, an integrated circuit design may have a performance specification that assures a maximum power of 100 watts at a maximum frequency of 2.5 gigahertz (GHz). However, a first chip might consume 90 watts of power at 2.5 GHz, while a second chip might consume 99 watts of power at 2.5 GHz. Therefore, if the power limit is reduced (e.g., by a user) to 90 watts, the second chip will have to reduce its frequency to reduce the power to 90 watts, while the first chip will not since the silicon associated with the first chip inherently consumes less power than the silicon associated with the second chip.

Referring back to FIG. 1, the system 10 includes a power measurement system 14 and a temperature measurement system 16. The power measurement system 14 provides a measurement of the actual power $P_{ACTUAL}$ consumed by the integrated circuit. The power measurement system 14 can employ a variety of different techniques to provide a measurement of the actual power $P_{ACTUAL}$ consumed by the integrated circuit. For example, the actual power measurement can be based on the relationship that: $P=C*V^2*F+L(V,T)$, where C is the switching capacitance of the integrated circuit, V is the supply voltage, F is the frequency of the system clock and $L(V,T)$ is the leakage power for the device which is a function of voltage and temperature. Alternatively, the actual power measurement can be measured based on current (I) and voltage (V) drawn from the power supply $P=V*I$. The temperature measurement system 16 measures the operating temperature of the integrated circuit. The temperature measurement system 16 can employ a variety of different techniques to provide a measurement of the operating temperature of the integrated circuit. For example, the temperature measurement system 16 can employ transistor speed as a proxy for temperature, or employ a voltage drop of a diode in determining temperature.

The system 10 also includes a working power evaluator 18. The working power evaluator 18 determines a working power limit $P_{WORK}$ that is a function of one or more performance factors that can vary across different integrated circuits of a given design due to manufacturing variations and different inherent characteristics associated with the different integrated circuits. The one or more factors can include a maximum performance factor. The maximum performance factor can adjust for variations in power consumption at maximum temperature and maximum frequency due to inherent characteristics of different chips of a given design. The one or more factors can include a temperature factor. The temperature factor can adjust for variations in power consumption due to changes in operating temperature for different chips of a given design. The one or more factors can include a power limit factor associated with a power limit setting that is less than the maximum allowable power limit for a given design. The change in maximum power limit setting can be initiated by a user of the chip or system. The power limit factor can adjust for variations in power consumption at a given performance level for different chips of a given design.

The one or more factors are determined based on a plurality of parameters. The plurality of parameters include, for example, an actual operating temperature measurement (TEMP), a maximum power specification limit ($P_{MAX}$) and a power limit setting ($P_{LIMIT}$). The plurality of parameters also include a plurality of manufacturing test parameters (TEST PARAMETERS). The plurality of manufacturing parameters are based on performance characterizations of a given integrated circuit at manufacturing tests under varying operating conditions. For example, a performance characterization can be based on a devices inherent power consumption at a given set of operational conditions. Additionally, a performance characterization can be based on a ratio of a devices switching power to total power and/or leakage power to total power at a given set of operational conditions. The plurality of manufacturing test parameters can be determined at manufacturing test and stored in a storage device associated with the system. The plurality of manufacturing test parameters, the actual operating temperature measurement, the maximum power specification limit and the power limit setting can be employed in real-time to dynamically modify the working power limit $P_{WORK}$ of the system 10.

Figure 2:
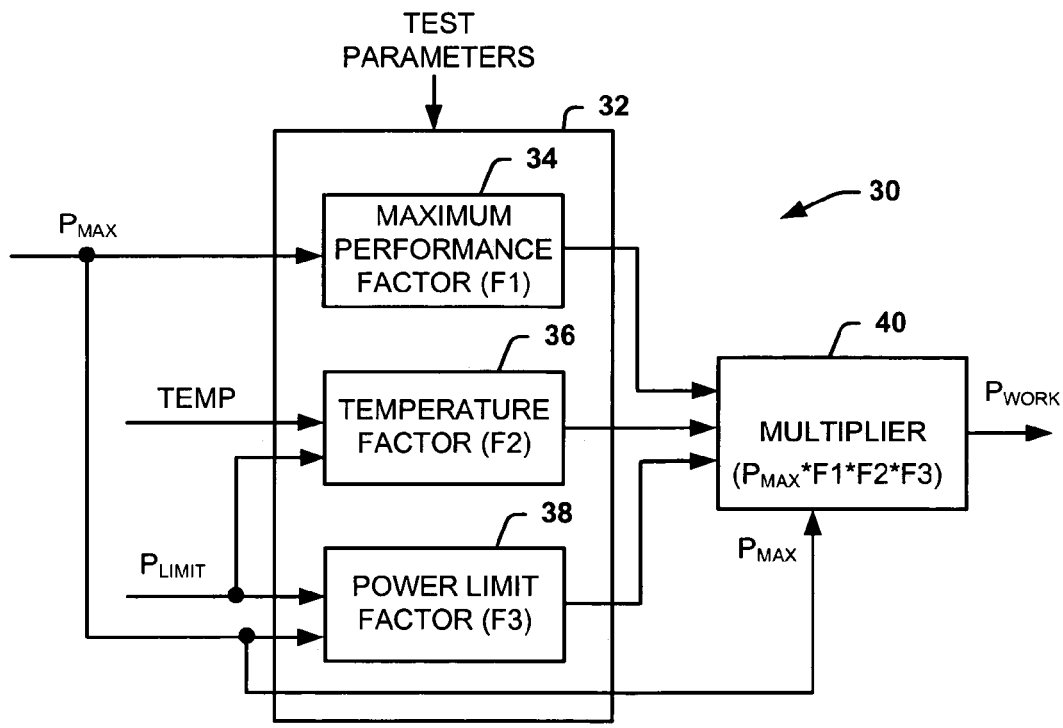
FIG. 2 illustrates a block diagram of an embodiment of a working power evaluator.

FIG. 2 illustrates a working power evaluator 30 for determining a working power limit for a power management system associated with an integrated circuit or die. The working power evaluator 30 includes a set of performance factors 32. The set of performance factors 32 provide adjustments to the working power limit of the power management system based on a plurality of parameters. The plurality of parameters can include operating condition parameters, user defined parameters, part specification parameters and manufacturing test parameters that define intrinsic characteristics associated with a given integrated circuit. The set of performance factors 32 include a maximum performance factor (F1) 34, a temperature factor (F2) 36 and a power limit factor (F3) 38.

The maximum performance factor (F1) 36 is based on evaluating the power consumption $P_{BASE}$ of a given integrated circuit at maximum temperature and maximum frequency, and scaling the base power consumption by the power limit setting. The following is one illustrated example of an equation for evaluating a maximum performance factor:

$$F1=(P_{LIMIT}/P_{MAX})*(P_{BASE}/P_{MAX}) \qquad \text{EQ. 1}$$

where $P_{BASE}$ is the power consumption at maximum temperature and maximum frequency at a specified activity factor ($AF_{SPEC}$), $P_{LIMIT}$ is the power limit setting set by a user and $P_{MAX}$ is the maximum allowable power consumption of the given integrated circuit design at maximum temperature and maximum frequency. It is to be appreciated that since switching power varies with software, the switching power can be expressed as a fraction of the maximum switching power for the integrated circuit as the activity factor AF. A specified activity factor ($AF_{SPEC}$) can be an activity factor that is representative of the most common application to be executed on the integrated circuit. The maximum performance factor 36 provides a ratio of the actual power consumption at maximum performance to the maximum allowable power consumption at maximum performance, which is scaled down by a power limit setting if one is provided. Therefore, if a first chip has a power consumption at maximum performance that is equal to the maximum allowable power consumption, and the power limit setting is set to the maximum allowable power consumption, the maximum performance factor is one and the working power is not adjusted. However, if a second chip has a power consumption at maximum performance that is below the maximum allowable power consumption and/or a power limit setting is provided that is below the maximum allowable power consumption, then the working power limit is adjusted based on F1, since the second chip provides a substantially similar performance (e.g., frequency) at low power than the first chip. Therefore, different integrated circuits operating with power consumption at maximum allowable power and below maximum allowable power can provide substantially similar performance.

The temperature factor (F2) 36 is based on evaluating the effects of temperature variations on power dissipation of a given integrated circuit. In particular, the temperature factor 36 relates to modifying the working power limit $P_{WORK}$ based on changes in leakage power consumption due to changes in temperature, since the subthreshold leakage of circuits (e.g., transistors) in the chip is substantially temperature dependent. Therefore, temperature has a greater effect on a device whose leakage power is greater than a device with lower leakage power. The temperature factor 36 provides for an adjustment to the working power limit $P_{WORK}$ based on modulating leakage power as a function of temperature, while switching power is not substantially affected by changes in temperature. As a result, the working power limit $P_{WORK}$ is reduced more as a result of temperature decreases for a chip that has a higher leakage to total power ratio than a chip that has a lower leakage to total power ratio to provide substantially the same performance from both chips. Therefore, chips with lower leakage power to overall power need a higher working power limit than chips with higher leakage power to produce a substantially similar frequency, since more power consumption is attributed to leakage power than to switching power.

The temperature factor (F2) also considers the effects of a power limit setting that is less than the maximum allowable power of the design. Therefore, the factor F2 adjusts the working power limit to compensate for changes in temperature (which results in changes to leakage power) due to changes in the power limit setting, for example, by a user. That is the integrated circuit will operate at a lower temperature when operating at a lower power. The following is one illustrated example of an equation for evaluating a temperature factor (F2):

$$F2=(T_P+(1-T_P)*\text{MIN}(\text{measured temp}+Rja(P_{MAX}-P_{LIMIT}),T_{MAX})/T_{MAX})^2 \quad \text{EQ. 2}$$

where $T_P$ is a temperature parameter, Rja is thermal resistance from junction to ambient, which is a product of the system design defining the change in temperature per watt of a die, $P_{MAX}$ is the maximum allowable power of the design, $P_{LIMIT}$ is the power limit setting and $T_{MAX}$ is the maximum temperature in which proper performance of the integrated circuit is guaranteed (and tested). The temperature parameter $T_P$ is derived empirically from a plurality of chips of a given design. The temperature parameter $T_P$ is functionally related to a power parameter $P_P$, which is the switching power over total power of the chip at maximum temperature, such that $1-P_P$ is equal to the leakage power over the total power. The temperature parameter $T_P$ also takes into consideration offsets for drive fights and termination resistors associated with the integrated circuit design. As illustrated above the relationship of $1-T_P$ is the associated leakage ratio, such that the leakage ratio percentage is modulated as a function of measured temperature.

The power parameter $P_P$ can be determined at manufacturing test by determining the total power ($P_{MAXFREQ}$) at maximum frequency and maximum temperature and determining the total power ($P_{MAXFREQ/2}$) at one-half maximum frequency and maximum temperature. Since leakage power does not change as a result in change in frequency, and switching power has a linear relationship with frequency, switching power can be determined as follows:

$$P_{LEAKAGE}=P_{BASE}-2*(P_{MAXFREQ}-P_{MAXFREQ/2}) \quad \text{EQ. 3}$$

$$P_{SWITCHING}=P_{BASE}-P_{LEAKAGE} \quad \text{EQ. 4}$$

$$P_P=P_{SWITCHING}/P_{BASE} \quad \text{EQ. 5}$$

The power limit factor (F3) 38 is based on evaluating the effects of a user set power limit below the maximum power at maximum frequency and maximum temperature. The power limit factor 38 compensates for power limit settings lower than the maximum allowable power limit. For example, a lower power limit will have a larger impact on chips that have a higher switching power component versus leakage power component than chips with a lower switching power component versus leakage power component. It is assumed for EQ. 3-5 that an activity factor ($AF_{SPEC}$) has been defined to establish switching power and base power. The activity factor $AF_{SPEC}$ can be an activity factor that is representative of the most common applications executed on the integrated circuit. As discussed above, the activity factor is a fraction of maximum switching power that is consumed by a given application or software.

Therefore, the power limit factor 38 provides for an adjustment to the working power limit $P_{WORK}$ based on modulating switching power as a function of power limit. As a result, the working power limit $P_{WORK}$ is reduced more for a chip that has a higher switching power to total power ratio than a chip that has a lower switching power to total power ratio to provide substantially the same performance from both chips. Therefore, chips with lower switching power to overall power need a higher working power limit than chips with higher switching power to overall power to produce a substantially similar frequency at a given power limit setting.

The power limit factor 38 also considers the effects of the inherent base power at maximum frequency and maximum power versus the maximum allowable power. Therefore, the factor F3 adjusts the working power limit $P_{WORK}$ to compensate for inherent differences in power consumption of a given integrated circuit operating at maximum specification for a given integrated circuit design. The following is one illustrated example of an equation for evaluating a power limit factor (F3):

$$F3=\text{MIN}((0.5+0.5(P_{BASE}/P_{MAX}))*(1-L_P)*(1-P_{LIMIT}/P_{MAX}),1) \quad \text{EQ. 6}$$

where $L_P$ is a leakage parameter, $P_{MAX}$ is the maximum allowable power of the design, $P_{LIMIT}$ is the power limit setting, $P_{BASE}$ is the power consumption at $AF_{SPEC}$, maximum temperature and maximum frequency in which proper performance of the integrated circuit is guaranteed. The leakage parameter $L_P$ is derived empirically from a plurality of chips of a given design. The leakage parameter $L_P$ is functionally related to a power parameter $P_P$. The power parameter $P_P$ is the switching power over total power of the chip at maximum temperature, such that $1-P_P$ is equal to the leakage power over the total power. The leakage parameter also takes into consideration offsets for drive fights and termination resistors associated with the integrated circuit design. As illustrated above the relationship of $1-L_P$ is the associated switching power ratio, such that the switching power percentage is modulated as a function of the power limit setting.

Figure 3:
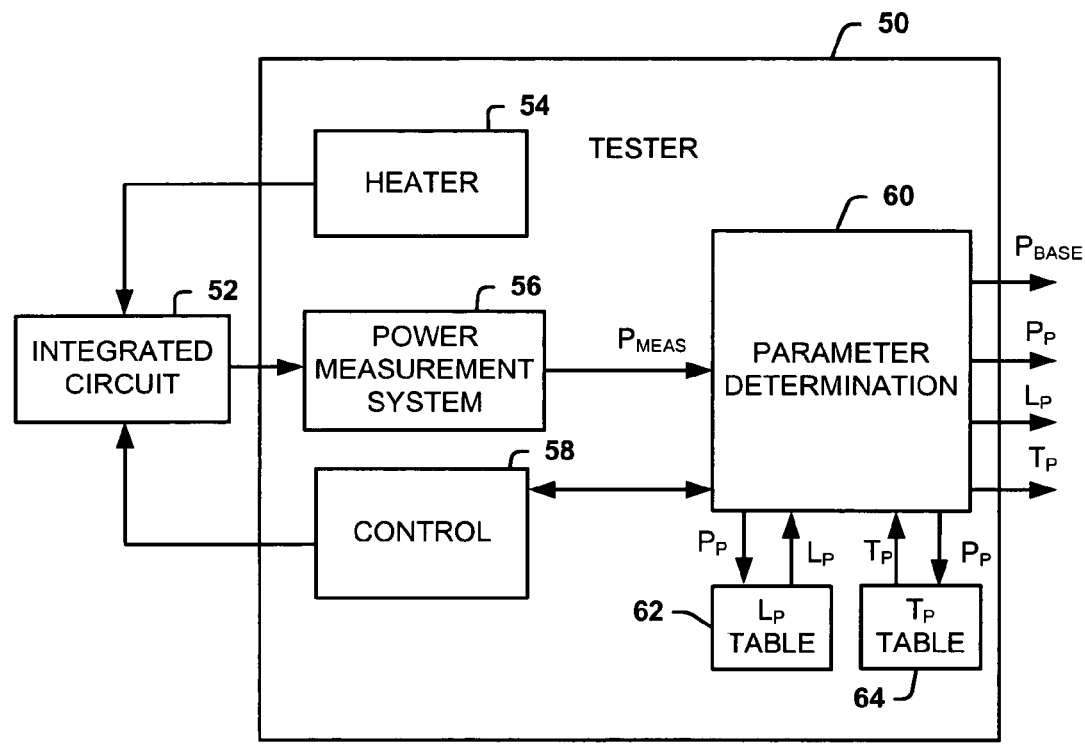
FIG. 3 illustrates a block diagram of an embodiment of a tester for determining a plurality of manufacturing test parameters.

FIG. 3 illustrates a tester 50 for determining a plurality of manufacturing test parameters associated with a given integrated circuit or die. The tester 50 includes a heater 54, a control device 58, a power measurement system 56 and a parameter determination component 60. The tester 50 is operative to heat an integrated circuit 52 to a desired temperature for testing via the heater 54. The control device 58 is operative to control operational conditions such as operational frequency and/or supply voltage of the integrated circuit 52. Alternatively, the control device 58 can be operative to program the integrated circuit 52 to control operational conditions of the integrated circuit 52 through an interface, for example, over a communication pin(s) of the integrated circuit 52. The power measurement system 56 determines actual power consumption of the integrated circuit 52 at one or more various operational and environmental conditions. Alternatively, the control device 58 or power measurement system 56 can be operative to retrieve power measurements from the integrated circuit 52 through an interface, for example, over a communication pin(s) of the integrated circuit 52.

The parameter determination component 60 determines manufacturing test parameters based on power measurements $P_{MEAS}$ at different operational and environmental conditions. For example, the parameter determination component 60 determines a base power $P_{BASE}$ by measuring the power dissipation at maximum frequency, $AF_{SPEC}$ and maximum temperature of the integrated circuit 52. The parameter determination component 60 computes a power parameter $P_P$ by determining the switching power to total power ratio of the integrated circuit. The power parameter $P_P$ can be determined by determining the total power ($P_{MAXFREQ}$) at maximum frequency and maximum temperature and determining the total power ($P_{MAXFREQ/2}$) at one-half maximum frequency and maximum temperature. Since leakage power does not change as a result in change in frequency, and switching power has a linear relationship with frequency, switching power can be determined by EQs. 3-5 above.

The power parameter $P_P$ is then employed as an index into a leakage parameter table 62 and a temperature parameter table 64. The leakage parameter table 62 includes a plurality of corresponding leakage parameter $L_P$ values and the temperature parameter table 64 include a plurality of corresponding temperature parameter $T_P$ values associated with the power parameter $P_P$ that have been determined based on empirical results. The leakage parameter table 62 and the temperature parameter table 64 can be integrated into a single table for simplicity. Table I illustrates an exemplary table that includes power parameter values and associated temperature parameter values and leakage parameter values.

TABLE I

| $P_P$ | $T_P$ | $L_P$ |
|---|---|---|
| 0.86 | 0.86 | 0 |
| 0.84 | 0.86 | 0 |
| 0.80 | 0.86 | .05 |
| 0.75 | 0.84 | .12 |
| 0.66 | 0.80 | .25 |
| 0.55 | 0.74 | .3 |
| 0.42 | 0.64 | .4 |
| 0.35 | 0.58 | .5 |

The leakage parameter $L_P$ is associated with the leakage ratio of the integrated circuit, while $1-L_P$ is associated with the switching ratio of the integrated circuit. The temperature parameter $T_P$ is associated with the switching ratio of the integrated circuit, while $1-T_P$ is associated with the leakage ratio of the integrated circuit. The temperature parameter $T_P$ and the leakage parameter $L_P$ also takes into consideration offsets for drive fights and termination resistors associated with the integrated circuit design. The tester 50 or some other device can store the manufacturing test parameters (e.g., $P_{BASE}$, $P_P$, $L_P$, $T_P$) in a storage device (e.g., ROM, electronic fuses) on the integrated circuit 52 for employment by a working power evaluator and power management system during normal operation.

Figure 4:
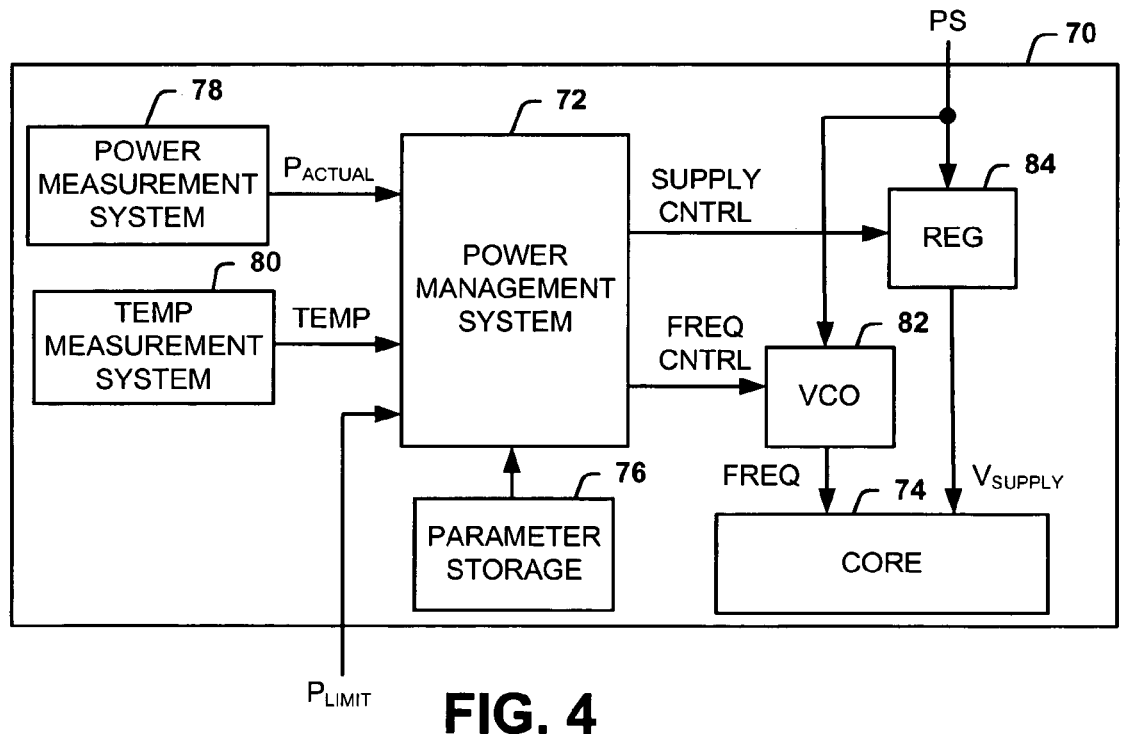
FIG. 4 illustrates a block diagram of an embodiment of an integrated circuit.

FIG. 4 illustrates an integrated circuit 70 that facilitates repeatable performance. The integrated circuit 70 includes a power management system 72 that includes a power management algorithm to maintain actual power consumption at or below a working power limit by periodically comparing a working power limit with the actual power consumption $P_{ACTUAL}$ of the integrated circuit chip or die. The power management system 72 manages power associated with the integrated circuit chip or die by dynamically varying frequency and supply voltage of the integrated circuit or die. The power management system 72 generates a frequency control signal (FREQ CONTROL) to a voltage controlled oscillator (VCO) 82, which functions as a system clock of the integrated circuit 70. The VCO 82 provides a clock signal at a frequency set by the power management system 72 to a core 74 of the integrated circuit 70. The power management system 72 generates a voltage supply control signal (SUPPLY CONTROL) to a system power supply or power regulator 84 that receives power of a power supply (PS) through a supply pin and provides a supply voltage $V_{SUPPLY}$ to the core 74 of the integrated circuit 70.

The working power limit is dynamically adjusted below a specified maximum allowable power limit for the integrated circuit 70 to provide performance repeatability, for example, by maintaining a substantially constant frequency at a given activity factor for a given application regardless of inherent characteristics, manufacturing variations and operational conditions. The working power limit is derived from at least one factor that is a function of performance variations on a given application across different integrated circuit chips of a given design.

The integrated circuit 70 includes a power measurement system 78 and a temperature measurement system 80. The power measurement system 78 provides a measurement of the actual power $P_{ACTUAL}$ consumed by the integrated circuit 70. The temperature measurement system 80 measures the operating temperature of the integrated circuit 70. The power management system 72 is also operative to receive a power limit setting $P_{LIMIT}$ through, for example, a pin of the integrated circuit 70. The power limit setting $P_{LIMIT}$ lowers the maximum allowable power $P_{MAX}$ to a user defined power limit.

The power management system 72 determines a working power limit that is a function of one or more performance factors that can vary across different integrated circuits of a given design due to manufacturing variations and different inherent characteristics associated with the different integrated circuits. The one or more factors can include a maximum performance factor, a temperature factor, and a power limit factor. The one or more factors adjust for variations in performance due to manufacturing variations, different inherent characteristics and varying operating conditions. The one or more factors are determined based on a plurality of parameters. The plurality of parameters include, for example, an actual operating temperature measurement (TEMP), a maximum power specification limit $P_{MAX}$ and a power limit setting ($P_{LIMIT}$). The plurality of parameters also include a plurality of manufacturing test parameters (e.g., $P_{BASE}$, $P_P$, $L_P$, $T_P$) stored in a parameter storage device 76 (e.g., ROM, electronic fuses) on the integrated circuit 70 for employment by the power management system 72 during normal operation.

The plurality of manufacturing parameters are based on performance characterizations of a given integrated circuit at manufacturing tests under varying operating conditions. For example, a performance characterization can be based on a device's inherent power consumption at a given set of operational conditions. Additionally, a performance characterization can be based on a ratio of a devices switching power to total power and/or leakage power to total power at a given set of operational conditions. The plurality of manufacturing test parameters (e.g., $P_{BASE}$, $P_P$, $L_P$, $T_P$), the actual operating temperature measurement (TEMP), the maximum power specification limit ($P_{MAX}$) and the power limit setting ($P_{LIMIT}$) can be employed in real-time to dynamically modify the working power limit of the integrated circuit 70.

Figure 5:
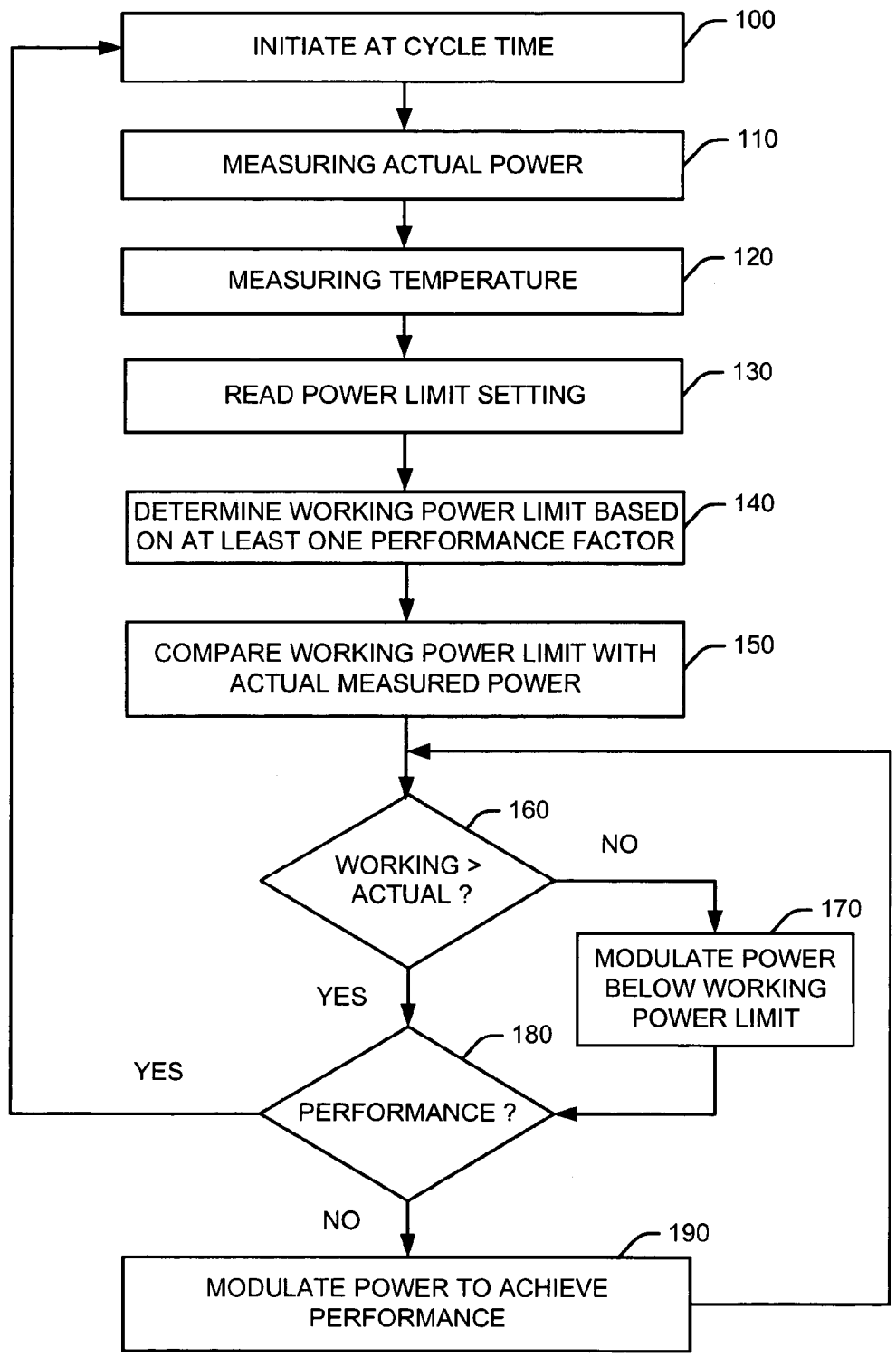
FIG. 5 illustrates an embodiment of methodology for maintaining performance.
Figure 6:
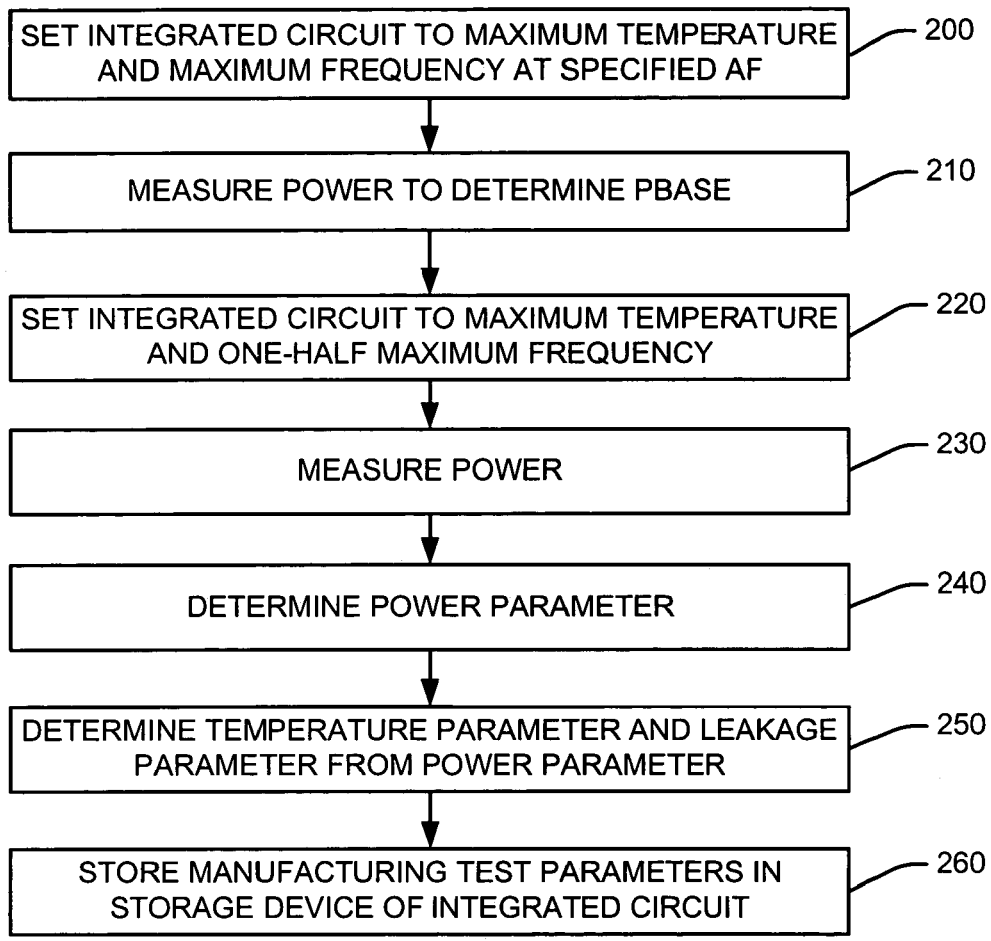
FIG. 6 illustrates an embodiment of a methodology for determining manufacturing test parameters.
Figure 7:
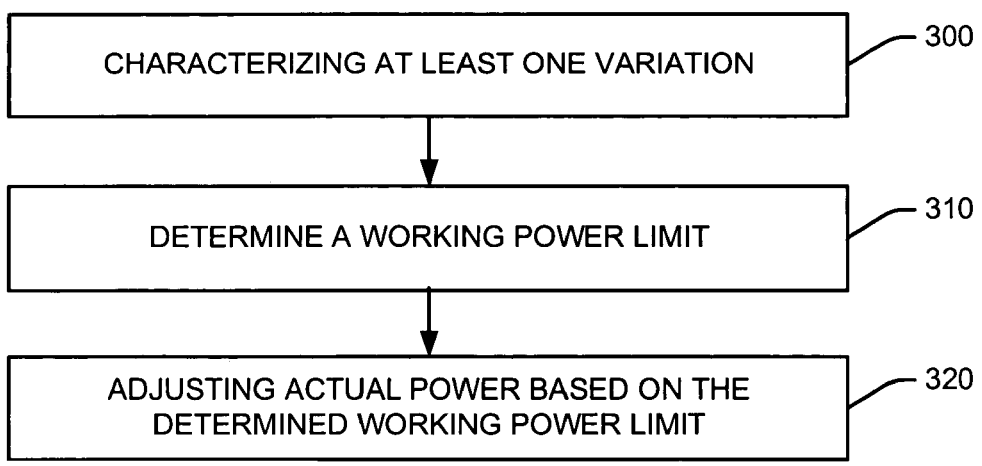
FIG. 7 illustrates another embodiment of methodology for maintaining performance.

In view of the foregoing structural and functional features described above, certain methods will be better appreciated with reference to FIGS. 5-7. It is to be understood and appreciated that the illustrated actions, in other embodiments, may occur in different orders and/or concurrently with other actions. Moreover, not all illustrated features may be required to implement a method.

FIG. 5 illustrates a methodology for maintaining performance of an integrated circuit. The methodology begins at 100 where a cycle time is initiated for a power management system. The methodology then proceeds to 110 to measure actual power consumption of the integrated circuit. The actual power consumption can be measured by a power measurement system residing on the integrated circuit, or by measuring actual power drawn by a supply voltage providing power to the integrated circuit. At 120, the operating temperature of the integrated circuit is measured. A variety of different temperature measurement devices can reside on the integrated circuit. At 130, a power limit setting is read. The power limit setting can be provided to the integrated circuit by a user. The power limit setting can be programmed or be set via a pin or set of pins on the integrated circuit. It is to be appreciated that the default power limit setting is the maximum allowable power specification of the integrated circuit at maximum frequency and maximum temperature. The methodology then proceeds to 140.

At 140, a working power limit is determined based on at least one performance factor. The at least one performance factor takes into consideration manufacturing variations and different inherent characteristics that can vary across different integrated circuits of a given design. The one or more factors can include a maximum performance factor that adjusts for variations in power consumption at maximum temperature and maximum frequency for different chips of a given design. The one or more factors can include a temperature factor that adjust for variations in power consumption due to changes in operating temperature for different chips of a given design. The one or more factors can include a power limit factor associated with a power limit setting that is less than the maximum allowable power limit for a given design. The power limit factor can adjust for variations in power consumption at a given performance level for different chips of a given design. The methodology then proceeds to 150.

At 150, the methodology compares the working power limit with the actual power measured. At 160, the methodology determines if the working power limit is greater than the actual power measured. If the working power limit is not greater than the actual power measured (NO), the methodology proceeds to 170. At 170, the power is modulated to provide an actual power that is below the working power limit. The methodology then proceeds to 180. If the working power limit is greater than the actual power measured (YES) at 160, the methodology proceeds to 180. At 180, the methodology determines if the desired performance (e.g., substantially constant frequency) is achieved. If the desired performance is not achieved (NO), the methodology proceeds to 190. At 190, the power is modulated to achieve the desired performance. The methodology then returns to 160. If the desired performance is achieved (YES), the methodology returns to 100 until the next cycle time is initiated.

FIG. 6 illustrates a methodology for determining manufacturing test parameters. At 200, an integrated circuit is set to maximum frequency and maximum temperature at a specified activity factor ($AF_{SPEC}$). At 210, power is measured at the maximum frequency and maximum temperature at the specified activity factor ($AF_{SPEC}$) to determine a base power. The methodology then proceeds to 220. At 220, the integrated circuit is set to maximum temperature and one-half the maximum frequency. The methodology then proceeds to 230 to measure power. At 240, a power parameter is derived from the base power and the measured power at maximum temperature and one-half the maximum frequency. The power parameter is the ratio of switching power to total power, and can be derived from multiplying the difference in power at maximum frequency and ½ maximum frequency by two, since the change in switching power is linear with frequency and can be interpolated for zero frequency. At 250, a temperature parameter and a leakage parameter are determined from the power parameter based on empirical results to determine a relationship between the power parameter and the temperature parameter and a leakage parameter. At 260, the manufacturing test parameters are stored in a storage device of the integrated circuit.

FIG. 7 illustrates another methodology for maintaining performance of an integrated circuit. At 300, at least one variation of the integrated circuit that affects performance is characterized. At 310, a working power limit is determined based on the characterization and a specified power limit. At 320, the actual power of the integrated circuit is adjusted based on the determined working power limit.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for maintaining performance of a particular integrated circuit of a given design, the system comprising:
   a working power limit evaluator to determine a working power limit as a function of at least one performance factor that is based on at least one parameter that varies across different integrated circuits of the given design due to manufacturing variations of the different integrated circuits, wherein the at least one performance factor is based on a ratio of actual power consumption at maximum performance to a maximum allowable power consumption at maximum performance; and
   a power management system to vary power of the particular integrated circuit based on the working power limit and an actual power of the particular integrated circuit, wherein the actual power of the particular integrated circuit is maintained at or below the working power limit.

2. The system of claim 1, wherein the at least one performance factor is a function of the at least one parameter that is further based on inherent characteristics of the different integrated circuits.

3. The system of claim 1, wherein the at least one performance factor compensates for the manufacturing variations that vary performance of the different integrated circuits for a given application.

4. The system of claim 1, further comprising a temperature measurement system to provide the working power evaluator with an operating temperature of the integrated circuit, the working power evaluator to determine a temperature factor that adjusts for variations in performance due to changes in temperature.

5. The system of claim 1, further comprising a power measurement system to provide the power management system with an actual power measurement.

6. The system of claim 1, wherein the power management system is configured to vary the power of the integrated circuit by varying a frequency and a supply voltage of the integrated circuit.

7. A system for maintaining performance of an integrated circuit, the system comprising:
 a working power limit evaluator to determine a working power limit as a function of at least one performance factor associated with variations that affect performance of the integrated circuit; and
 a power management system to vary power of the integrated circuit based on the working power limit and an actual power of the integrated circuit to maintain a substantially constant performance,
 wherein the at least one performance factor is based on at least one manufacturing test parameter,
 wherein the at least one manufacturing test parameter is at least one of inherent base power which is a measure of actual power at maximum frequency and maximum temperature at a specified activity factor, a leakage parameter which is functionally related to the ratio of leakage power to base power, and a temperature parameter which is functionally related to the ratio of switching power to base power.

8. A system for maintaining performance of an integrated circuit, the system comprising:
 a working power limit evaluator to determine a working power limit as a function of at least one performance factor associated with variations that affect performance of the integrated circuit, wherein the at least one performance factor includes a temperature factor that provides for an adjustment to the working power limit based on modulating leakage power as a function of temperature; and
 a power management system to vary power of the integrated circuit based on the working power limit and an actual power of the integrated circuit to maintain a substantially constant performance,
 wherein the working power limit evaluator is to adjust the working power limit based on performance variations caused by manufacturing variations and inherent characteristics of the integrated circuit to provide substantially similar performance on a given application over a plurality of integrated circuits of a given design.

9. An integrated circuit comprising:
 a parameter storage device to store at least one manufacturing test parameter that is based on at least one of inherent characteristics and manufacturing variations of the integrated circuit;
 a power management system to vary power of the integrated circuit based on actual power of the integrated circuit and a working power limit derived from the at least one manufacturing test parameter and at least one operational condition to maintain a substantially constant performance; and
 a temperature measurement system to provide an operating temperature of the integrated circuit, the power management system to determine a temperature factor for adjusting the working power limit based on the operating temperature and the at least one manufacturing test parameter,
 wherein the temperature factor employs a temperature parameter, which is a measure of the percentage of switching power to total power of the integrated circuit, to adjust the working power limit based on the percentage of leakage power to total power of the integrated circuit.

10. An integrated circuit comprising:
 a parameter storage device to store at least one manufacturing test parameter that is based on at least one of inherent characteristics and manufacturing variations of the integrated circuit; and
 a power management system to vary power of the integrated circuit based on actual power of the integrated circuit and a working power limit derived from the at least one manufacturing test parameter and at least one operational condition to maintain a substantially constant performance,
 wherein the at least one manufacturing test parameter comprises an inherent base power, which is a measure of actual power at maximum frequency and maximum temperature at a specified activity factor, the power management system to determine a maximum performance factor based on the inherent base power over a maximum allowable power of the integrated circuit.

11. The circuit of claim 10, wherein the maximum performance factor is based on a power limit setting over the maximum allowable power of the integrated circuit multiplied by the base power over the maximum allowable power of the integrated circuit.

12. An integrated circuit comprising:
 a parameter storage device to store at least one manufacturing test parameter that is based on at least one of inherent characteristics and manufacturing variations of the integrated circuit; and
 a power management system to vary power of the integrated circuit based on actual power of the integrated circuit and a working power limit derived from the at least one manufacturing test parameter and at least one operational condition to maintain a substantially constant performance,
 wherein the at least one manufacturing test parameter comprises a leakage power parameter, which is a measure of the percentage of leakage power to total power of the integrated circuit, the power management system to determine a power limit factor based on the leakage power parameter and a power limit setting to adjust the working power limit based on the percentage of switching power to total power of the integrated circuit.

13. The circuit of claim 12, further comprising a power measurement system to provide the power management system with an actual power measurement.

14. The circuit of claim 12, further comprising a temperature measurement system to provide an operating temperature of the integrated circuit, the power management system to determine a temperature factor for adjusting the working power limit based on the operating temperature and the at least one manufacturing test parameter.

15. The circuit of claim 12, wherein the at least one operational condition comprises at least one of operating temperature, a power limit setting and a maximum allowable power for the integrated circuit.

16. The system of claim 12, wherein the power management system is configured to vary the power of the integrated circuit by varying a frequency and a supply voltage of the integrated circuit.

17. A method for maintaining performance of an integrated circuit, the method comprising:
    characterizing at least one variation of the integrated circuit that affects performance;
    determining a working power limit based on the characterization and a specified power limit; and
    adjusting an actual power of the integrated circuit based on the determined working power limit by varying at least one of a supply voltage and a frequency of the integrated circuit,
    wherein the determining a working power limit comprises evaluating at least one performance factor and multiplying the at least one performance factor by the specified power limit,
    wherein the at least one performance factor is a function of parameters derived from the characterization of the at least one variation, the variations comprising at least one of inherent characteristics of the integrated circuits, manufacturing variations of the integrated circuit and operating conditions of the integrated circuit,
    wherein characterization of the at least one variation comprises determining at least one of leakage a power to total power ratio and a switching power to total power ratio due at least in part to manufacturing variations of the integrated circuit.

18. A method for maintaining performance of an integrated circuit, the method comprising:
    characterizing at least one variation of the integrated circuit that affects performance;
    determining a working power limit based on the characterization and a specified power limit;
    adjusting an actual power of the integrated circuit based on the determined working power limit by varying at least one of a supply voltage and a frequency of the integrated circuit; and
    measuring an operating temperature of the integrated circuit and employing the measured temperature and a leakage power to total power ratio of the integrated circuit to determine the working power limit.

19. A method for maintaining performance of an integrated circuit, the method comprising:
    characterizing at least one variation of the integrated circuit that affects performance;
    determining a working power limit based on the characterization and a specified power limit;
    adjusting an actual power of the integrated circuit based on the determined working power limit by varying at least one of a supply voltage and a frequency of the integrated circuit; and
    employing a power limit setting by a user and a switching power to total power ratio of the integrated circuit to determine the working power limit.

20. A method for maintaining performance of an integrated circuit, the method comprising:
    characterizing at least one variation of the integrated circuit that affects performance;
    determining a working power limit based on the characterization and a specified power limit;
    adjusting an actual power of the integrated circuit based on the determined working power limit by varying at least one of a supply voltage and a frequency of the integrated circuit; and
    employing a base power measurement which is a measure of power consumption at maximum frequency and maximum temperature at a specified activity factor of the integrated circuit to determine the working power limit.

21. The method of claim 20, wherein the specified power limit is one of a maximum allowable power of the integrated circuit and a power limit setting defined by a user.

22. The method of claim 20, wherein the determining a working power limit comprises evaluating at least one performance factor and multiplying the at least one performance factor by the specified power limit.

23. The method of claim 22, wherein the at least one performance factor is at least one of a maximum performance factor, a temperature factor and a power limit setting factor.

24. The method of claim 20, further comprising:
    measuring an actual power of the integrated circuit;
    comparing the actual power with the working power limit; and
    modulating the actual power below the working power limit if the actual power exceeds the working power limit.

25. The method of claim 24, further comprising:
    determining if desired performance is achieved; and
    modulating the actual power if the desired performance has not been achieved.

* * * * *